United States Patent [19]

Tsotsis

[11] Patent Number: 5,518,796
[45] Date of Patent: May 21, 1996

[54] NEAR-SURFACE ENHANCEMENT OF HONEYCOMB SANDWICH STRUCTURES TO IMPROVE DURABILITY USING A FOAMING FIBER-FILLED ADHESIVE

[75] Inventor: Thomas K. Tsotsis, Orange, Calif.

[73] Assignee: Ciba-Geigy Corporation, Tarrytown, N.Y.

[21] Appl. No.: 435,771

[22] Filed: May 5, 1995

Related U.S. Application Data

[63] Continuation-in-part of Ser. No. 61,651, May 13, 1993, abandoned.

[51] Int. Cl.$^6$ ..................................................... B32B 3/12
[52] U.S. Cl. .............................. 428/116; 428/117; 428/118
[58] Field of Search ............................... 428/116, 117, 428/118

[56] References Cited

U.S. PATENT DOCUMENTS

| | | | |
|---|---|---|---|
| 3,249,659 | 5/1966 | Voelker | 428/117 X |
| 3,771,748 | 11/1973 | Jones | 428/116 X |
| 4,052,523 | 10/1977 | Rhodes | 428/116 |
| 4,053,667 | 10/1977 | Smith | 418/116 X |
| 4,336,292 | 6/1982 | Blair | 428/116 |
| 4,933,131 | 6/1990 | Okey et al. | 428/116 X |
| 4,937,125 | 6/1990 | Sanmartin et al. | 428/116 |
| 5,041,323 | 8/1991 | Rose et al. | 428/116 |
| 5,106,668 | 4/1992 | Turner et al. | 428/116 |
| 5,186,999 | 2/1993 | Brambach | 428/117 |

OTHER PUBLICATIONS

G. Grimes et al. Society for Advancement of Material and Process Engineering, 37th Int. SAMPE Symposium & Exhibition vol. 37 172–185

Primary Examiner—Henry F. Epstein
Attorney, Agent, or Firm—Luther A. R. Hall

[57] ABSTRACT

A honeycomb sandwich panel modified by the controlled incursion of a foaming fiber-filled adhesive into the upper region of the honeycomb provides a panel having increased durability when the upper surface is subjected to localized compressive loads.

34 Claims, 2 Drawing Sheets

5,518,796

NEAR-SURFACE ENHANCEMENT OF HONEYCOMB SANDWICH STRUCTURES TO IMPROVE DURABILITY USING A FOAMING FIBER-FILLED ADHESIVE

This is a continuation-in-part of application Ser. No. 08/061,651, filed on May 13, 1993, now abandoned.

This invention pertains to a low weight panel with increased durability when the upper surface is subjected to localized compressive loads.

BACKGROUND OF THE INVENTION

Current sandwich structures used for aircraft flooring use only a single density honeycomb core in this construction. Heavy traffic on such flooring frequently causes failure or damage to the upper surface requiring that the flooring be replaced at great cost and inconvenience.

In order to increase the durability of such flooring panels and to increase their resistance to concentrated transverse compressive loads, either more skin material or higher honeycomb core densities or both must be used. Both of these remedies are basically unacceptable since they each substantially increase the panel weight. This is an unacceptable solution for aircraft structures where a minimum weight is always desired.

Many attempts to solve the problems stated above have been made. U.S. Pat. No. 4,937,125 describes one approach where a multilayer sandwich structure having a core interposed between and external and internal skin. The upper skin is a composite layer-polyester layer-honeycomb layer-metal sheet-glass fiber reinforced epoxy layer-composite layer. The core is a honeycomb. The internal skin is a metal sheet or a skin of the same composition as the external skin.

U.S. Pat. Nos. 4,336,292; 5,041,323 and 5,106,668 describe multi-layered panels comprised substantially of two or several subpanels—one possibly with a higher density core than the other(s)—bonded together to form a complete panel.

Accordingly, improving the upper surface properties of sandwich structures which are subject to in-use concentrated loads to make them more durable is highly desired. This will reduce life-cycle costs for airlines by decreasing the-necessity for replacing damaged panels. The instant invention provides that improved panel by tailoring the core to have enhanced properties just where needed (right below the upper skin) to achieve greater resistance to concentrated transverse compressive loads with a much smaller or even no weight penalty.

Honeycomb sandwich structures are widely used for aircraft flooring materials. In these structures, the in-plane and bending properties needed are those derived from design requirements of the airframe manufacturers. The out-of-plane properties are, by contrast, determined from test data on existing materials which are believed to meet the perceived requirements. It is known that the damage that causes panels to be replaced after use in aircraft occurs almost exclusively at the top surface of the panels and is due to concentrated out-of-plane loads. This damage is believed to be due to passenger foot traffic (most likely from high heels) administering localized concentrated loads on the panels.

The instant invention addresses the issue of floor panel durability by providing constructions which increase the resistance of aircraft flooring to concentrated out-of-plane loads without either increasing weight or significantly influencing cost when compared to standard uniform density honeycomb core construction. By using higher density materials near the top (loaded) surface of a sandwich structure, the resistance to damage such as core fracture, resin fracture, core buckling, etc. due to localized compressive loads is increased.

The use of foam-filled or foam cores in sandwich panels is well-known. The use of foam to fill honeycomb or lattice structures is a low density, low cost way to stabilize core structures. U.S. Pat. No. 3,249,659 demonstrates a method for introduction of foam into a honeycomb or lattice core at the top and bottom surfaces while leaving the middle section of the core untilled. The benefit of this method is a reduction of weight without a significant loss of core stabilization. Because the resins used to make-up the foaming adhesive of the U.S. Pat. No. 3,249,659 invention are untilled liquids and hence non-structural, no out-of-plane (transverse to the skin) mechanical property enhancement is provided. French 2,171,949 also describes a similar honeycomb product, useful for thermal and acoustic insulation purposes, wherein both the upper and lower surfaces are adhered to surface layers by use of an adhesive foam. The foam is sprayed onto the surface layer and said foam is not fiber-filled. Neither of these references relates to the instant products.

In order to avoid the use of epoxy resins which have poor flame, smoke and toxicity (FST) properties, U.S. Patent No. 4,135,019 teaches the use of carbon microballoons held in place by a bismaleimide resin. These structures do not enhance mechanical properties unless there is a significant increase in weight. Inspection of the composites made by the process of U.S. Pat. No. 4,135,019 as seen in Table 1 shows that the weight of such composites is 40% higher than the cited prior an. This is an unacceptable weight penalty.

U.S. Pat. No. 5,135,799 describes laminates used for insulation purposes which have a foam or honeycomb core attached to a fiber reinforced non-foaming cover layer of heat resistant material. U.S. Pat. No. 4,053,667 teaches fib-stiffened laminates obtained by molding and the use of stiffener beads. Foaming adhesives are not disclosed. U.S. Pat. No. 3,771,748 describes the use of foaming aahesives to stiffen the edge of a layer of honeycomb to bind it to support members. There is no disclosure that the foaming adhesive penetrates into the honeycomb core or that the foaming adhesive is fiber-filled.

In summary, none of the prior art focuses on the instant invention which is directed toward the solution to a practical problem for which there has been a long-felt need.

SUMMARY OF THE INVENTION

The invention pertains to a honeycomb sandwich structure wherein the density of the honeycomb core itself is modified by the controlled incursion of a structural foaming adhesive which is fiber-filled in the upper region of said core. This essentially increases the density of said upper region of the core and thus enhances the resistance of the upper surface to damage by localized compressive forces.

More particularly, the instant invention is to a modified honeycomb sandwich panel having upper surface enhancement for improved resistance to localized compressive loads which comprises a honeycomb core sheet having a multiplicity of cells, said cells directed traverse to said panel;

a bottom skin adhered to the lower surface of the honeycomb with an adhesive; and a top skin adhered to the upper surface of the honeycomb core sheet with a foaming, fiber-filled adhesive which partially penetrates into the upper region of the honeycomb core as the adhesive cures thus increasing the density of said core in said region and concomitantly enhancing the upper surface of the panel, said foaming adhesive being filled with chopped or milled fibers.

The foaming adhesive is filled (10 to 50% by weight) with chopped or milled fibers which act to both stiffen and strengthen the adhesive. Fiber loading is limited only by processability and the desired expansion ratio.

BRIEF DESCRIPTION OF THE DRAWINGS

Details of the invention and of the preferred embodiments thereof will be further understood upon reference to the drawings wherein.

DETAILED DISCLOSURE

Figure 1:
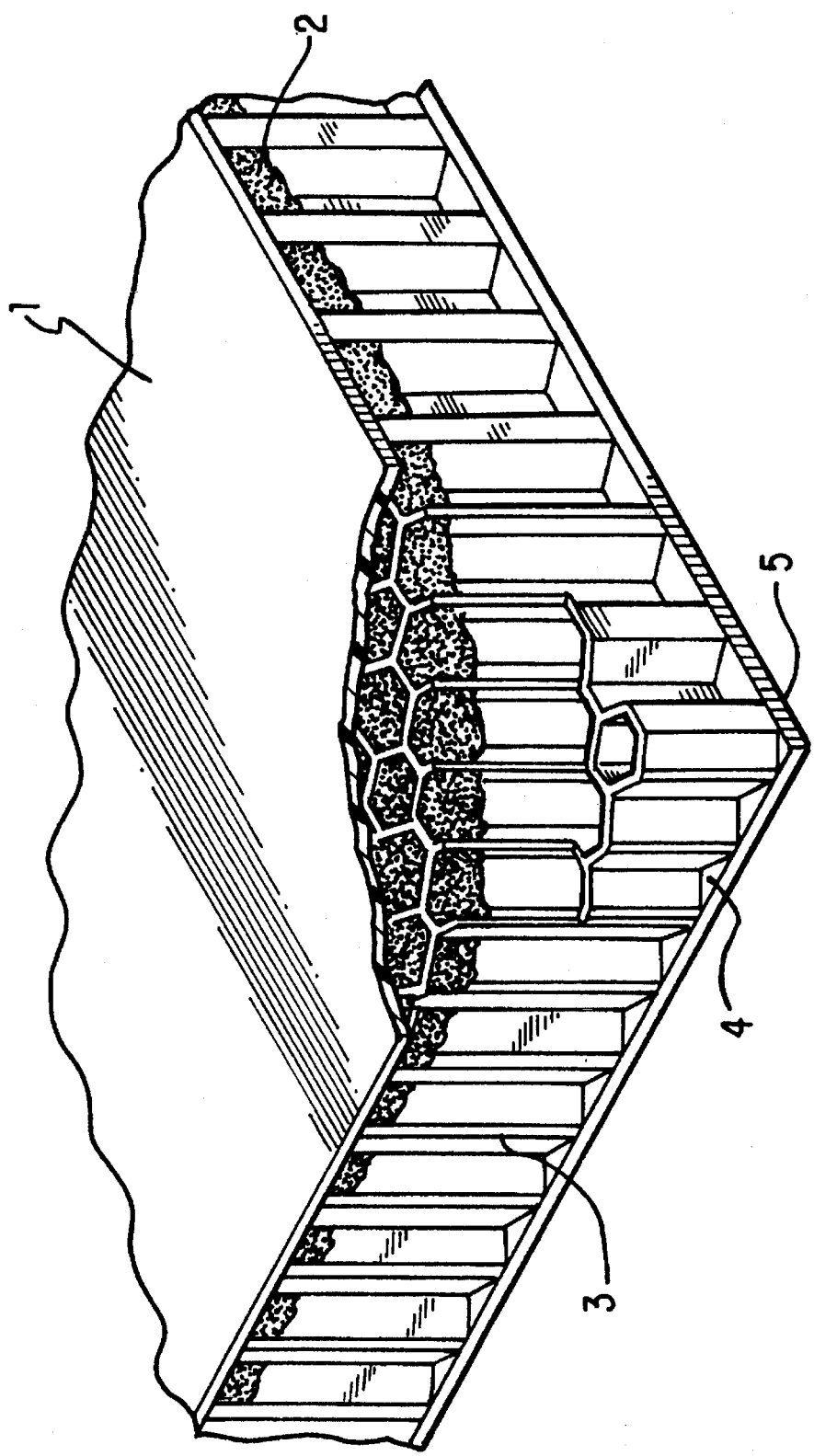
FIG. 1 is a perspective view, partially cut away, of the instant sandwich panel.
Figure 2:
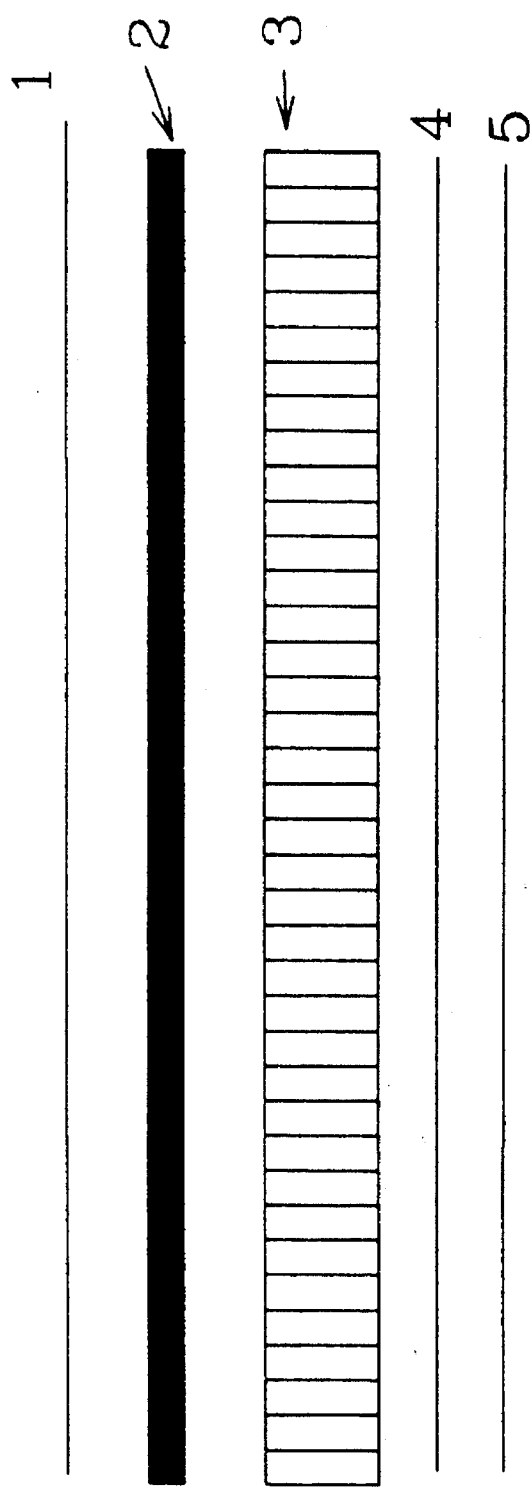
FIG. 2 is a vertical schematic view through the panel of FIG. 1.

The present invention pertains to a honeycomb sandwich structure as seen in FIG. 1 with two skins 1 and 5 preferably made from fiber glass epoxy, but which may also be made from graphite/epoxy, graphite/phenolic and the like which are adhesively bonded to a honeycomb core 3 preferably made from aluminum or a paper composed of thermoplastic fiber such as NOMEX® (aramid fiber, E. I. dupont de Nemours, Wilmington, Del.). The top skin 1 is bonded to the honeycomb core by use of a foaming, fiber-filled adhesive 2 and the bottom skin with a standard non-foaming epoxy 4. The mass density of the core may range from 1 lb/ft$^3$ (16 kg/m$^3$) to 55 lb/ft$^3$ (880 kg/m$^3$), preferably 3 lb/ft$^3$ (48 kg/m$^3$) to 11.5 lb/ft$^3$ (184 kg/m$^3$), but is most preferably 4 lb/ft$^3$ (64 kg/m$^3$) to 6 lb/ft$^3$ (96 kg/m$^3$), and still especially preferably 5 lb/ft$^3$ (80 kg/m$^3$).

The adhesive 4 bonding the bottom skin 5 to the honeycomb core 3 may be a foaming, fiber-filled adhesive or preferably a non-foaming adhesive.

The honeycomb core 3 is made of an inorganic paper, a formable plastic, a thermoplastic fiber paper or a metal. Preferably, the honeycomb core 3 is made of a thermoplastic paper, most preferably aramid fiber paper, or aluminum.

When the adhesive 2 or 4 is a thermoset resin or when the top skin 1 or the bottom skin 5 is a fiber reinforced resin which is a thermoset resin, said resin is an epoxy, phenolic, polyester or polyimide resin.

When the adhesive 2 or 4 is a thermoplastic resin or when the top skin 1 or the bottom skin 5 is a fiber reinforced resin which is a thermoplastic resin, said resin is a polycarbonate, polyetherimide, polyetherketone, polysulfone, polyester, poly(arylene sulfide), polyamide or polyphenylene oxide resin.

The foaming adhesive 2 may be filled with either glass or carbon fibers. The fibers may range in length between 0.010 and 0.060 in. (0.25–1.5 mm) and preferably are 0.030 in. (0.8 mm) in length. The foaming adhesive exhibits low flow and an expansion ratio between 2 and 5, preferably between 3 and 4. Too much expansion reduces the foaming adhesive density and correspondingly its mechanical properties.

The following examples are presented for the purpose of illustration only and are not to be construed to limit the nature or scope of the instant invention in any manner whatsoever.

| Materials Used | | |
|---|---|---|
| Skins: | UD S2-Glass/DLS-280 Unidirectional S2-glass/DLS epoxy prepreg (Ciba Composites, Anaheim) | 10TPI (fiber tows per inch) |
| Core: | Aeroweb HMX ⅛ NOMEX ® Honeycomb ⅛" cell size (Ciba Composites, Anaheim) | −5.0 lb/ft$^3$ −9.0 lb/ft$^3$ |
| | Aluminum ⅛ Honeycomb ⅛" cell size | −6.0 lb/ft$^3$ |
| Adhesives: | Skin-to-Core Foaming Composites, Anaheim) (All adhesives are epoxy based.) | R377 370FR (Ciba FM37 (glass-filled) |

EXAMPLE 1

A panel is assembled as for single core panels with the top skin-to-core adhesive being a foaming, fiber-filled adhesive. Referring to FIG. NOS. 1 and 2, skins 1 and 5 are preferably fiber glass reinforced epoxy resin. Other materials such as graphite/epoxy, graphite/phenolic, aluminum and the like may also be used. The foaming, fiber filled adhesive 2 is used to bond the top skin to the core 3 and is preferably epoxy based. During the curing process, the foaming, fiber-filled adhesive 2 expands, foams, penetrates and subsequently hardens to form a dense layer beneath the top skin 1 and in the upper region of the honeycomb core 3. The other adhesive layer 4 is preferably an epoxy, but may also be a polyimide or other appropriate non-foaming thermosetting polymeric resin.

EXAMPLE 2

Test Methods

A simply-supported 12"×12" (305 mm×305 mm) panel, prepared in Example 1, is loaded using a flat-faced circular cylindrical steel indenter of either ¼" (6.35 mm) or ½" (12.7 mm) diameter placed atop a ⅛" (3.18 mm) Shore hardness 55–65 silicone rubber which is placed between the indenter and the top surface of the panel to be tested.

Load versus displacement is continuously monitored during the loading process. When a discrete load drop occurs, the test is ended and the maximum load reached prior to load drop is recorded as indentation strength.

In order to account for variations between core batches, in all cases, indentation strength data from the reinforced or enhanced surface are compared with either a section of the same panel which is unreinforced or with the bottom of the same panel which is also unreinforced. Therefore, all indentation strength comparisons are measured between identical cores.

Using a foaming, fiber-filled adhesive to modify the upper part of the honeycomb core to convert it from a "low" density to a "high" density area, the following samples are prepared and tested.

| Example | Core | Top Surface Skin-to-Core Adhesive |
|---------|------|-----------------------------------|
| A | HMX-⅛-5.0 | 370 FR Foaming Adhesive |
| B | HMX-⅛-9.0 | FM37 Foaming Adhesive |
| C | Aluminum 6.0 pcf | FM37 Foaming Adhesive |

| | First Load Drop (lb) ¼ inch (6.35 mm) Indenter | | |
|---|---|---|---|
| Example | With Foam, Enhanced Surface | Without Foam, Unreinforced Surface | Percent Difference |
| A | 108 | 75 | +45 |
| B | 207 | 147 | +40 |
| C | 153 | 94 | +63 |

| | ½ inch (12.7 mm) Indenter | | |
|---|---|---|---|
| Example | With Foam, Enhanced Surface | Without Foam, Unreinforced Surface | Percent Difference |
| A | 200 | 153 | +31 |
| B | 394 | 322 | +22 |
| C | 259 | 194 | +33 |

The surface adjacent to the high density honeycomb prepared by using the foaming, fiber-filled adhesive exhibits significantly superior resistance against indentation as measured by the first load drop values.

What is claimed is:

1. A modified honeycomb sandwich panel having upper surface enhancement for improved resistance to localized compressive loads which comprises
   a honeycomb core sheet having a multiplicity of cells, said cells directed traverse to said panel;
   a bottom skin adhered to the lower surface of the honeycomb with an adhesive; and
   a top skin adhered to the upper surface of the honeycomb core sheet with a foaming adhesive which partially penetrates into the upper region of the honeycomb core as the adhesive cures thus increasing the density of said core in said region and concomitantly enhancing the upper surface of the panel, said foaming adhesive being filled with chopped or milled fibers.

2. A panel according to claim 1 wherein the bottom skin is adhered to the lower surface of the honeycomb with a non-foaming adhesive which does not penetrate into the honeycomb structure.

3. A panel according to claim 2 wherein the non-foaming adhesive is a thermoset resin.

4. A panel according to claim 3 wherein the non-foaming adhesive is an epoxy resin, a phenolic resin or a polyimide resin.

5. A panel according to claim 2 wherein the non-foaming adhesive is thermoplastic resin.

6. A panel according to claim 1 wherein the honeycomb core sheets are selected from the group consisting of an inorganic paper, a formable plastic, a thermoplastic fiber paper and a metal.

7. A panel according to claim 6 wherein the honeycomb core sheets are selected from the group consisting of a thermoplastic fiber paper and aluminum.

8. A panel according to claim 6 wherein the honeycomb core sheet is an aramid fiber paper.

9. A panel according to claim 6 wherein the metal is aluminum.

10. A panel according to claim 1 wherein the honeycomb core sheet has a mass density between 1 lb/ft$^3$ and 55 lb/ft$^3$.

11. A panel according to claim 1 wherein the honeycomb core sheet has a mass density between 3 lb/ft$^3$ and 11.5 lb/ft$^3$.

12. A panel according to claim 1 wherein the honeycomb core sheet has a mass density between 4 lb/ft$^3$ and 6 lb/ft$^3$.

13. A panel according to claim 1 wherein the foaming adhesive is a thermoset resin.

14. A panel according to claim 13 wherein the foaming adhesive is an epoxy resin, a phenolic resin or a polyimide resin.

15. A panel according to claim 1 wherein the foaming adhesive is thermoplastic resin.

16. A panel according to claim 1 wherein the foaming adhesive if filled with glass fibers.

17. A panel according to claim 1 wherein the foaming adhesive is filled with carbon fibers.

18. A panel according to claim 1 wherein the top skin and the bottom skin are composed of the same material.

19. A panel according to claim 1 wherein the top skin and the bottom skin are composed of the same material and are a fiber reinforced resin.

20. A panel according to claim 19 wherein the fiber reinforced resin is a glass- or graphite-reinforced thermoset resin.

21. A panel according to claim 20 wherein the thermoset resin is an epoxy, phenolic, polyester or polyimide resin.

22. A panel according to claim 19 wherein the fiber reinforced resin is a glass- or graphite-reinforced thermoplastic resin.

23. A panel according to claim 22 wherein the thermoplastic resin is a polycarbonate, polyetherimide, polyetherketone, polysulfone, polyester, poly(arylene sulfide), polyamide or polyphenylene oxide resin.

24. A panel according to claim 1 wherein the top skin and the bottom skin are composed of the same material and are a metal.

25. A panel according to claim 24 wherein the metal is aluminum.

26. A panel according to claim 1 wherein the top skin and the bottom skin are composed of different materials.

27. A panel according to claim 26 wherein one of the skins is a metal.

28. A panel according to claim 27 wherein the metal is aluminum.

29. A panel according to claim 26 wherein one of the skins is a fiber reinforced resin.

30. A panel according to claim 29 wherein the fiber reinforced resin is a glass- or graphite-reinforced thermoset resin.

31. A panel according to claim 30 wherein the thermoset resin is an epoxy, phenolic, polyester or polyimide resin.

32. A panel according to claim 29 wherein the fiber reinforced resin is a glass- or graphite-reinforced thermoplastic resin.

33. A panel according to claim 32 wherein the thermoplastic resin is a polycarbonate, polyetherimide, polyetherketone, polysulfone, polyester, poly(arylene sulfide), polyamide or polyphenylene oxide resin.

34. A panel according to claim 1 wherein the bottom skin is adhered to the lower surface of the honeycomb with a foaming adhesive.

* * * * *